United States Patent [19]

Braun et al.

[11] Patent Number: 4,963,028

[45] Date of Patent: Oct. 16, 1990

[54] DENSITOMETRIC SENSING DEVICE FOR USE IN PRINTING PRESSES

[75] Inventors: Rolf Braun, Offenbach am Main; Alfred Dorn, Rodgau; Joachim Muller, Pullach, all of Fed. Rep. of Germany

[73] Assignee: MAN Roland Druckmaschinen, Offenbach am Main, Fed. Rep. of Germany

[21] Appl. No.: 268,744

[22] Filed: Nov. 8, 1988

[30] Foreign Application Priority Data

Nov. 16, 1987 [DE] Fed. Rep. of Germany ....... 3738850

[51] Int. Cl.$^5$ .............................................. G01N 21/00

[52] U.S. Cl. ..................................... 356/445; 356/380

[58] Field of Search ................................ 356/445–448, 356/379, 380, 375, 138, 141, 373; 364/520, 518–520; 250/221, 561, 557

[56] References Cited

U.S. PATENT DOCUMENTS 4,648,048 3/1987 Doin et al. .......................... 356/375

4,806,002 2/1989 Simeth et al. ....................... 356/445

*Primary Examiner*—Richard A. Rosenberger

*Assistant Examiner*—Hoa Pham

*Attorney, Agent, or Firm*—Leydig, Voit & Mayer

[57] ABSTRACT

Method and apparatus for scanning an ink test strip printed on a sheet, the sheet being positioned on a table traversed in two directions by a scanning head. The table includes guide means including a bar for positioning the sheet in a first dimension and an index mark for positioning the sheet and its associated test strip in a second dimension. The scanning head indexes to the index mark which physically establishes a first coordinate for the test strip. Thereupon, the scanning head indexes in a second direction to automatically locate the test strip based on the size of the test strip as sensed by the densitometric sensing device associated with the scanning head. Having located the second coordinate $Y_s$ for the initial test patch of the test strip, the system then initiates the scan along the test strip to measure the optical density of each test patch relating to each printed zone on the sheet.

11 Claims, 6 Drawing Sheets

DENSITOMETRIC SENSING DEVICE FOR USE IN PRINTING PRESSES

FIELD OF THE INVENTION

This invention relates to printing presses, and more particularly to a densitometric scanner for sensing the density of an ink test strip printed on a sheet.

BACKGROUND OF THE INVENTION

It is well known that densitometric sensing devices have been used in connection with printing presses to measure the printed density of the ink on a zone-by-zone basis along a test strip usually printed along one edge of the sheet. Standards are set for the desired density in each zone and for each color, and the measured densities are compared against the standards. If one or more of the measured density values are outside the desired range set by the standards, adjustments are made to the press, typically to the ink supply device supplying the particular color ink to the zone in question, until the measured density is brought into the desired range. Sheets are scanned periodically to assure that the densities remain as desired and thus the printed product will be of high quality.

One such scanning device is shown in Ott EP-OS 149 424. As disclosed in Ott, an information code is printed adjacent the test strip for accurate location of the appropriate measurement position. This feature is expensive and has the disadvantage that even more space is required on the printed sheet for densitometric sensing, a consideration which further reduces its desirability.

Another approach for scanning an ink test strip is described in published German patent application DE 36 31 204 and U.S. Pat. application Ser. No. 096,596. The scanning head disclosed in those documents includes a linear array of sensors disposed generally transverse to the test strip and having a span which is wider than the test strip such that some of the sensors will be over the test strip even if there is misalignment between the test strip and scanning direction of the head. Control means responsive to the signals from the individual sensors determines which of the sensors are over the test strip and utilizes the readings from those sensors as a measure of the density of the zone of the test strip being scanned. While such an approach provides reliable results, it requires more than one sensor in the test head, requires the sensors to be fairly accurately matched, and requires additional complexity in the control circuitry for determining which of the sensors are over the test strip.

Yet a further approach to postioning a densitometric sensing head with respect to an ink test strip is to provide the sensing head with a zig zag motion which continually traverses the strip. The zig zag pattern assures that the scanning head crosses the strip numerous times during each traverse. However, such an apparatus does not operate properly when the test strip is intermittent, i.e., when some of the patches within the test strip are unprinted. That is typically the case when a multicolored test strip is used but one or more of the colors in the multicolor strip is not printed in particular zones on a page. In that case, the test strip for that color in those zones will be unprinted, and the zig zag motion of the scanning head will serve to confuse the control circuitry because no test strip will be detected. In addition, some scanning heads are arranged to bear, by means of a wheel or runner, on the sheet being scanned.

In that case, the zig zag motion of the scanning head tends to smear the fresh ink on the sheet as well as foul the wheel or runner of the scanning head with ink picked up from the strip.

In summary, with respect to these approaches, it is seen that one approach requires additional complexity of the test strip in order the guide the sensor head over the test strip, another requires additional complexity in the scanning head coupled with means for selecting the signals from the multiple sensors, and the third lacks adequate reliability in many cases.

SUMMARY OF THE INVENTION

In view of the foregoing, the primary object of the present invention is to provide a simple and inexpensive means for automatically postioning a densitometric sensing head with respect to an ink test strip without overly complicating either the ink test strip or the scanning head.

According to a particular aspect of the invention, it is an object to provide a densitometric sensing head for scanning an ink test strip which automatically and accurately positions itself with respect to the test strip even when the test strip is incomplete, i.e., has unprinted patches within the test strip.

In accordance with the invention, there is provided a supporting surface for a printed sheet having guide means for positioning the sheet in two dimensions. A traversing scanning head is provided for movement in two orthogonal directions. A control circuit causes the traverse of the scanning head in a first direction to locate it in a predetermined and known location with respect to the printed sheet and the test strip on the sheet. The control means further includes means for traversing the scanning head in a second direction for locating the test strip on the sheet by means of sensing the size and location of the test strip. The thus located scanning head is then traversed along the test strip to provide readings for each of the printing zones on the press.

It is a feature of the invention that physically positioning the sheet on the support surface tends to provide the control circuit with one starting coordinate of the location of the test strip, the control means advances the scanning head to that coordinate then traverses the scanning head in a second direction to operate in conjunction with a densitometric sensing means to locate the second starting coordinate of the test strip. The test strip is thus located with sufficient accuracy that no zig zag motion is necessary, and thus ink smearing is eliminated. Furthermore, the test strip need not be associated with indicator marks for signalling the scanning head as to the location of the test strip, nor are multiple sensing means in the scanning head necessary.

As a further feature of the invention, the control circuit is provided with means for storing the second starting coordinate of the test strip from the previously scanned sheet, and the control means, at the start of scanning the next sheet, then simply traverses the scanning head to the orthogonal coordinates used for the previously scanned sheet following which a short traverse in the second direction can be made to assure that the scanning head is accurately located over the test strip.

Other objects and advantages of the present invention will be apparent from the following detailed description with reference to the accompanying drawings in which:

While the invention will be described in connection with certain preferred embodiments, there is no intent to limit it to those embodiments. On the contrary, the intent is to cover all alternatives, modifications and equivalents included within the spirit and scope of the invention as defined by the appended claims.

DETAILED DESCRIPTION OF THE PREFERRED EMBODIMENTS

Figure 1:
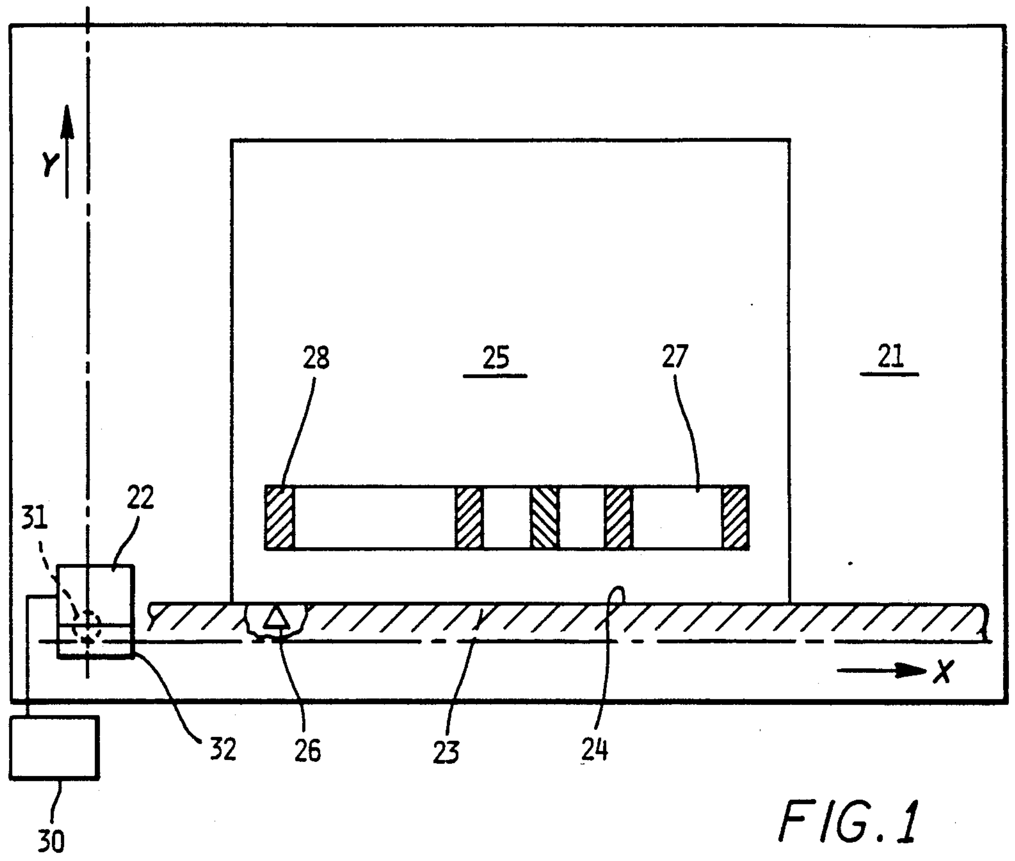
FIG. 1 is a schematic plan view illustrating an ink density measuring system exemplifying the present invention.

Turning now to the drawings, FIG. 1 schematically illustrates a density measuring system for a printing press exemplifying the present invention. The apparatus is based on a measuring table 21 on which a density measuring head 22 is mounted for traversing along guide means 23. The guide means 23 is preferably in the form of a raised bar having an edge 24 which rises from the surface of the table 21 for forming a lower stop for a sheet 25 positioned on the table 21. Thus the upstanding surface 24 of the guide bar 23 provides a first guide for locating the sheet 25 in a first dimension on the table 21.

In practicing the invention, means are provided for locating the sheet in a second dimension, preferably orthogonal to the first, such means being shown herein as index mark 26 associated with the guide bar 23. In locating the sheet 25 on the table 21, the operator first positions the lower edge of the sheet along the surface 24 of the guide bar 26, then moves the sheet left or right to position the first test patch 28 of a test strip 27 opposite the indicator 26. Such positioning may be aided by means of a small draftsman's square which can be temporarily positioned on the guide bar 23 to establish the location for the first test patch 28.

It will be noted at this point that for the sake of simplicity the orthogonal positioning of the sheet and the scanning of the head will be sometimes referred to as being accomplished in the X and Y directions. Such reference is merely for purposes of convenience, and when such terms are used in the specification and claims, there is no intent to limit particular directions to horizontal or vertical, but simply to conveniently express a pair of mutually orthogonal axes.

For the purpose of scanning the densities of the patches on the test strip 27 of the thus positioned sheet 25, the scanning head 22 is provided with drive means schematically illustrated at 30 for traversing the scanning head 22 along the mutually orthogonal axes denoted by X and Y. Means are also provided for determining the position or amount of travel of the scanner 22, such means being schematically illustrated in FIG. 1 as a portion of the scanning head 22 which includes position encoder 32. Such position encoder determines at least the position along the X axis so as to allow the scanning head 22 to find the index mark 26, but also in some cases relates position along the Y axis. Where the position encoder does not relate position along the Y axis, the associated processor computes Y position based on time or distance of travel of the scanning head 22 in the Y direction. While in many cases it will be convenient to index the scanner along the axes individually, it will be appreciated that it is also possible to index along both axes at the same time resulting in movement of the scanning head 22 on a diagonal line between the orthogonal axes X and Y.

In addition to the drive means and position sensing elements of the scanning head 22, importantly there is provided densitometric sensing means, typically including a light source and photo receptor. Scanning means in the FIG. 1 illustration is indicated by dashed circle 31 which represents the sensing area of the photo receptor. Conventionally, the photo receptor is coupled to densitometric circuitry; accordingly, the intensity of light received by the receptor 31 is converted to an electrical signal which in turn is converted by the densitometric circuitry to provide a measure of the optical density of the test patch of the test strip being scanned.

Figure 2:
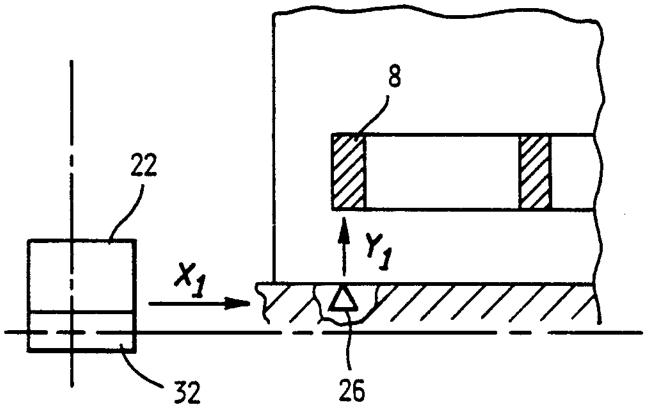
FIG. 2 is a partial view illustrating the scanning movement of the measuring head of FIG. 1.

As will be described in greater detail below, the apparatus is preferably controlled by a microprocessor which controls the automatic movement of the measuring head 22 and records the optical density of the respective patches of the test strip 27. In operation, the operator first places the sheet 25 on the table 21 with the initial test patch 28 of the test strip 27 aligned with the index mark 26. Having thus positioned the sheet with the initial test patch 28 in a predetermined reference location along the X axis, the operator then initiates the automatic scanning by signalling the processor that the sheet is in position. Thereupon, as shown in FIG. 2, the processor drives the scanning head 22 along the X axis until the position detecting circuitry 32 determines that the sensor 31 is in a predetermined relationship with respect to the index mark 26. That can be accomplished either by measuring the travel from the home position to the reference mark 26 or by an optical sensor which detects the index mark 26 on the guide bar 23. In any event, having achieved the appropriate X position, the scanning head 22, as shown in FIG. 2, is then driven by means of the drive means in the +Y direction, with the object being locating the optical detector 31 in the appropriate position with respect to the initial test patch 28 of the test strip 27. Preferably, the optical receiver 31 is located about centrally within the initial test patch 28 as indicated in FIG. 3*a*.

As will be described in greater detail below, various options are available for achieving the relationship illustrated in FIG. 3*a*. Briefly, as shown in FIG. 3*b* during the indexing of the scanning head in the +Y direction, the FIG. 3*b* condition (i.e., detection of the leading edge $Y_L$ of the test patch) can be detected at which the optical receptor 31 of the scanning head just begins to enter the initial test patch. Such condition can be detected by virtue of the fact that the optical detector 31 had been detecting unprinted white paper, and then begins to encounter the printed test patch thereby increasing the optical density which is being scanned. Scanning continues in the +Y direction until the FIG. 3*c* condition is encountered, (i.e., the detection of the trailing edge $Y_T$ of the test patch) sensed by the densitometric circuitry as a decrease in optical density resulting when the sensor 31 begins to leave the printed test patch and again enter the unprinted white sheet. Thus, it is seen that the densitometric sensing elements effectively sense the size of the test patch as a means of locating a scanable section thereof; such provision renders the system relatively immune to interference caused by dirt or the like on the sheet.

Figure 3A:
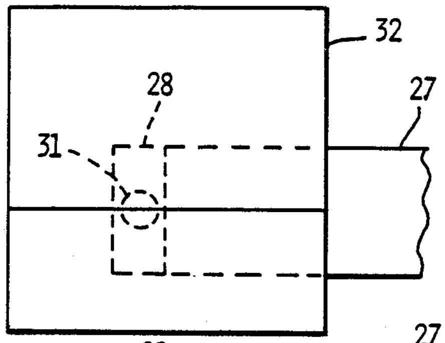
FIGS. 3*a*–3*c* are diagrams illustrating the location of the sensing head over the initial test patch of the test strip.
Figure 3B:
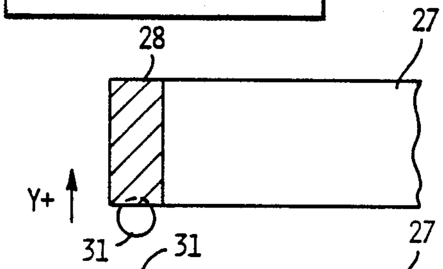
Figure 3C:
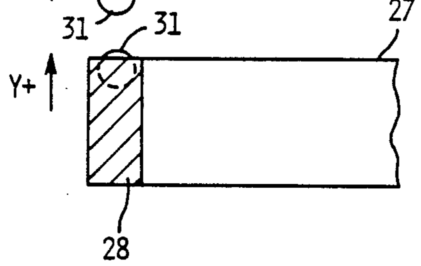

An exemplary procedure, sufficient for an understanding of the invention at this point, is to determine the Y coordinates associated with FIGS. 3b and 3c, and perform an averaging computation on those coordinates to determine an intermediate starting coordinate $Y_s$, then to index the scanning head from the FIG. 3c position to the starting coordinate $Y_s$ as shown in FIG. 3a. Other means are also available and will be described in greater detail in connection with the operating flow charts of the system. In any event, having achieved the position illustrated in FIG. 3a, the scanning head is positioned at the starting orthogonal coordinates in both the X and Y direction for the test strip, at which point scanning is commenced. More particularly, the optical density of the first test patch 28 is read following which the drive means 30 traverses the scanner in the X direction along subsequent test patches. By virtue of signals either from encoding means 32 or from timing circuitry operating in conjunction with the traversing means, the densitometric sensing circuitry is strobed as the sensor 31 of the scanning head 22 passes over each of the individual test patches, thus providing readings for the optical density for each color in each zone of the printing press.

As a further feature of the invention, when subsequent sheets are scanned, the scanning can be simplified when advantage is taken of the fact that the test strip is typically positioned in the same position on the sheet and thus has the same relationship with respect to the sheet edge or the guide bar 23. Thus, memory means are provided in association with the microprocessor for recording the Y coordinate $Y_S$ of the initial test strip 28. After the sheet is scanned and a subsequent sheet is put in its place, the system knows the X coordinate $X_s$ by virtue of the index mark 26, and recalls the Y coordinate $Y_s$ from the prior sheet. The drive means 30 thereupon traverses the scanning head 22 to the starting coordinates $X_s$, $Y_s$, either seriatim as illustrated in FIG. 2 or concurrently by means of a diagonal movement. Having achieved the starting coordinates $X_s$, $Y_s$ for the previous sheet, the scanning head is then slightly indexed in the plus and/or minus Y directions to assure that the Y coordinate is proper. If, for example, movement in the plus and minus Y directions over a short interval indicates no change in optical density during that movement, the original $Y_s$ coordinate is selected as a good approximation of the starting coordinate of the test strip, and scanning of the remainder of the strip is commenced. If, however, a change in optical density occurs in either the plus or minus scanning directions in the incremental index about Y, the $Y_s$ coordinate is appropriately altered to achieve a better approximation for a starting Y coordinate $Y_s$ before scanning is commenced.

It will be seen that the control system is greatly simplified in that the operator provides one of the coordinates for the initial scanning movement $X_s$, and the system determines the second coordinate $Y_s$ without the need for any printed index marks. The system operates in conjunction with the densitometric sensing means and the known relationship between the size of the scanning aperture 31 and the test patch 28 to locate the former in an intermediate position on the latter to achieve simple and reliable scanning.

Figure 4:
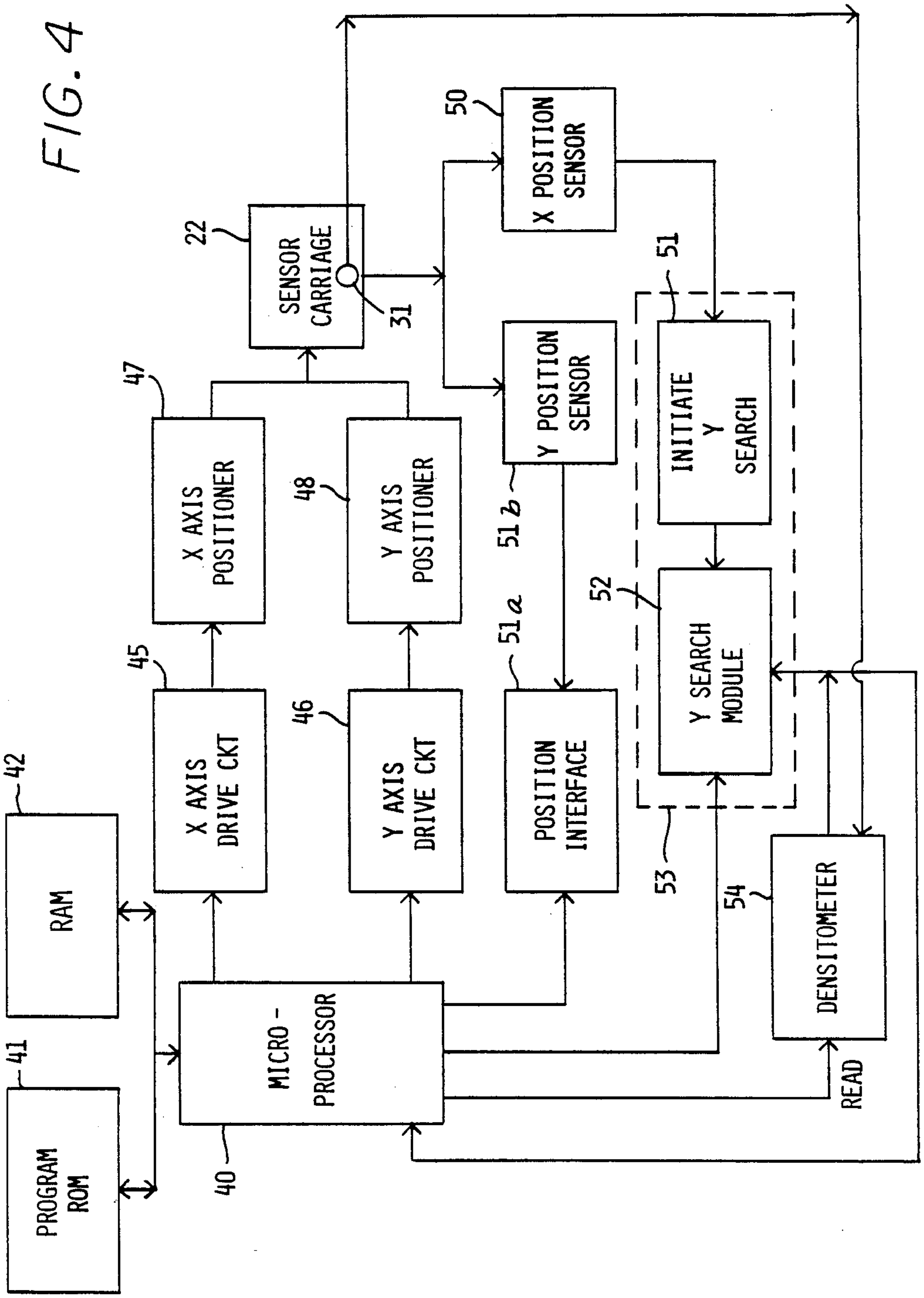
FIG. 4 is a block diagram illustrating the interrelationship between the elements of the system of FIG. 1.

Turning now to FIG. 4, there are illustrated the functional elements which make up the system of FIG. 1 to achieve the mode of operation described in detail above. As noted, a microprocessor 40 is provided which functions as a major control element for the system. Associated with the microprocessor 40 are a program ROM 41 which contains the operating program of instructions and a random access memory RAM 42 which provides readable and writable memory locations for storing temporary results and the like.

As described generally above, the microprocessor 40 controls the positioning of the scanning head 22 in the plane of the table 21, most easily considered in the form of orthogonal X and Y coordinates. For that purpose, a pair of drive interface circuits 45, 46 are provided, the interface 45 circuit controlling an X axis position servo 47 for positioning the scanning head along the X axis, and the Y axis drive interface circuit 46 controlling a similar Y axis position servo 48 for controlling the motion of the scanning head in the Y direction.

In the embodiment illustrated in FIG. 4, both X and Y position sensors are provided, the X position sensor being indicated at 50 and the Y position sensor at 51b. Alternatively as noted above, particularly when synchronous drives are used for the scanning head 22, a simple timing circuit can serve to provide a signal relating to scanning head position. In the illustrated embodiment, the X position sensor 50 has an output coupled to a module 51 which controls the initiation of the Y coordinate search. The module 51 which initiates the Y search, in turn is coupled to a module 52 which is the Y search module, the module which determines the Y starting coordinate $Y_s$ for the scan of the test strip. The modules 51, 52 are illustrated within a dashed rectangle 53; such dashed rectangle is utilized to indicate that the modules are preferably implemented as programs performed by the microprocessor 40 in connection with the program ROM 41 and the temporary storage RAM 42.

In practicing the invention, when the microprocessor operates the X axis drive circuit 45 to drive the X axis positioning servo 47 and thereby move the scanning head 22 along the guide bar 23, the X position sensor is active to determine when the scanning head reaches the index mark 26. When the scanning head reaches the index mark 26, the module 51 detects that position and initiates a search for a starting Y coordinate. At that time, the X drive is disabled, and the microprocessor 40 actuates, operating through the Y axis drive circuit interface 46, the Y axis position servo 48 to drive the scanner 22 in the positive Y direction. By detecting edges of the initial test patch 28 or other characteristics of such test patch 28 in conjunction with the densitometric measuring circuitry, the Y search module 52 locates a starting Y coordinate $Y_s$ for the scan, and signals the microprocessor 40 that such coordinate has been located. Preferably, the microprocessor 40, operating in conjection with Y position sensor 51b and position interface 51a, stores within a predetermined location in the RAM 42 an indication of the starting Y coordinate $Y_s$ for use in scanning of subsequent sheets.

It is seen that the photodetector element 31 within the scanning head 22 has an output coupled to a densitometer circuit 54 and also coupled to the Y search module 52. Thus, either by means of the raw signal from the sensor 31 or the processed signal from the densitometer 54, the Y search module is informed of transitions into and/or out of the intitial test patch 28 as a means of calculating the initial Y starting coordinate $Y_s$.

Having thus located the initial starting coordinates $X_s$, $Y_s$ for the scanning head, the microprocessor 40 then triggers a scan of the entire test strip. The X axis drive circuit 45 is actuated to drive the X axis position servo 47 to move the scanning head 22 parallel to the guide, but at the coordinate $Y_s$ such that the sensor 31 traverses all of the test patches of the test strip 27. The microprocessor 40 has an output coupled to the densitometer 54 for triggering the densitometer to take readings for each of the test strips. Those readings can be taken in dependence on signals received via the X position sensor 50, or alternatively can be taken in a predetermined time sequence coordinated with the programmed motion of the scanning head across the test strip.

The operation of the system is best illustrated in connection with the flow chart of FIG. 5. After the program starts at a step 60, the microprocessor, in a step 61, operates the X axis positioning elements to drive the servo to the X index signified by the index mark 26. Following that, a step 62 is performed to determine the $Y_s$ coordinate, that is, the starting Y coordinate for the test strip which is identified by the size and location of the initial test patch 28 in the test strip as sensed by the densitometric circuitry. Having determined or calculated the starting coordinate $Y_s$, a step 63 is then performed to traverse the scanning head 22 to the $Y_s$ coordinate of the test strip. Following that a step 64 is performed to measure the density of the test patch underlying the sensor. The measurement is taken and recorded, and in a step 65 the system increments the scanning head in the X direction to the position of the next test patch. It is noted that such incrementing can be done on a continuous basis rather than intermittently, so long as the densitometer is strobed at the appropriate points in time to measure the optical density of each subsequent test patch. A test 66 is performed after each measurement to determine if the test patch which has just been measured is the last. If it is not, the program loops back through the step 64 and 65 to measure the next test patch. After the last test patch has been measured, the test 66 tests positive following which the microprocessor returns the sensor to the home position in a step 67 and the scanning program is at an end (step 68).

Figure 5:
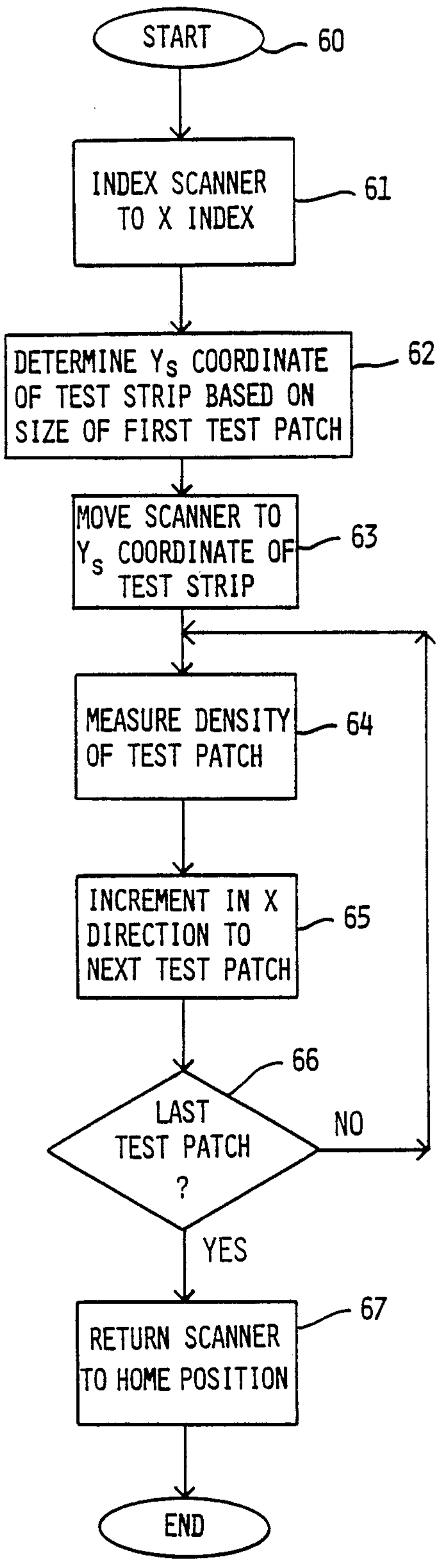
FIG. 5 is a flow chart illustrating the operation of the system of FIG. 1.
Figure 6:
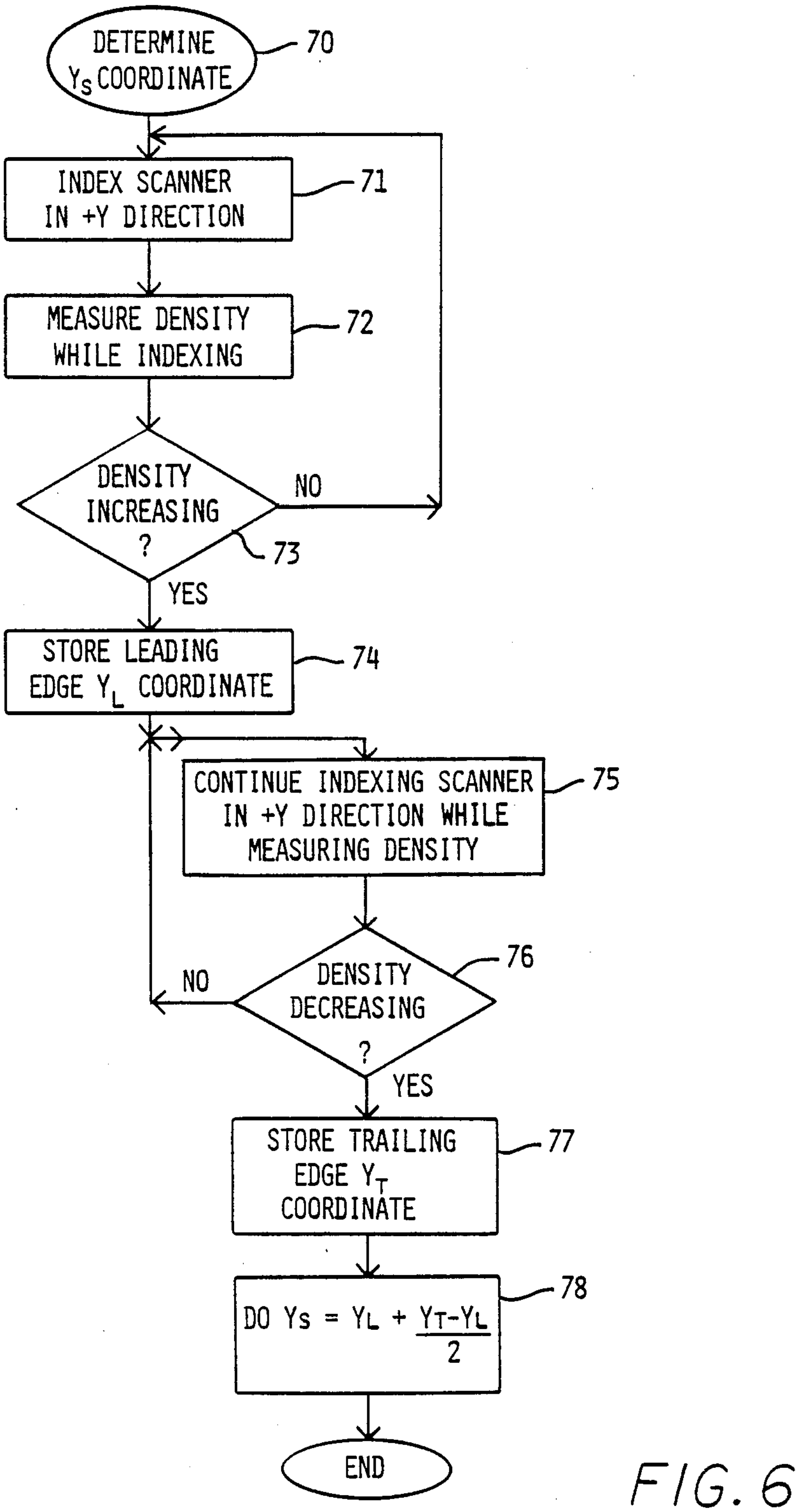
FIGS. 6 and 7 are flow charts illustrating alternative means for determining the initial Y coordinate of the test strip by means of scanning while traversing the test strip in the Y direction.
Figure 7:
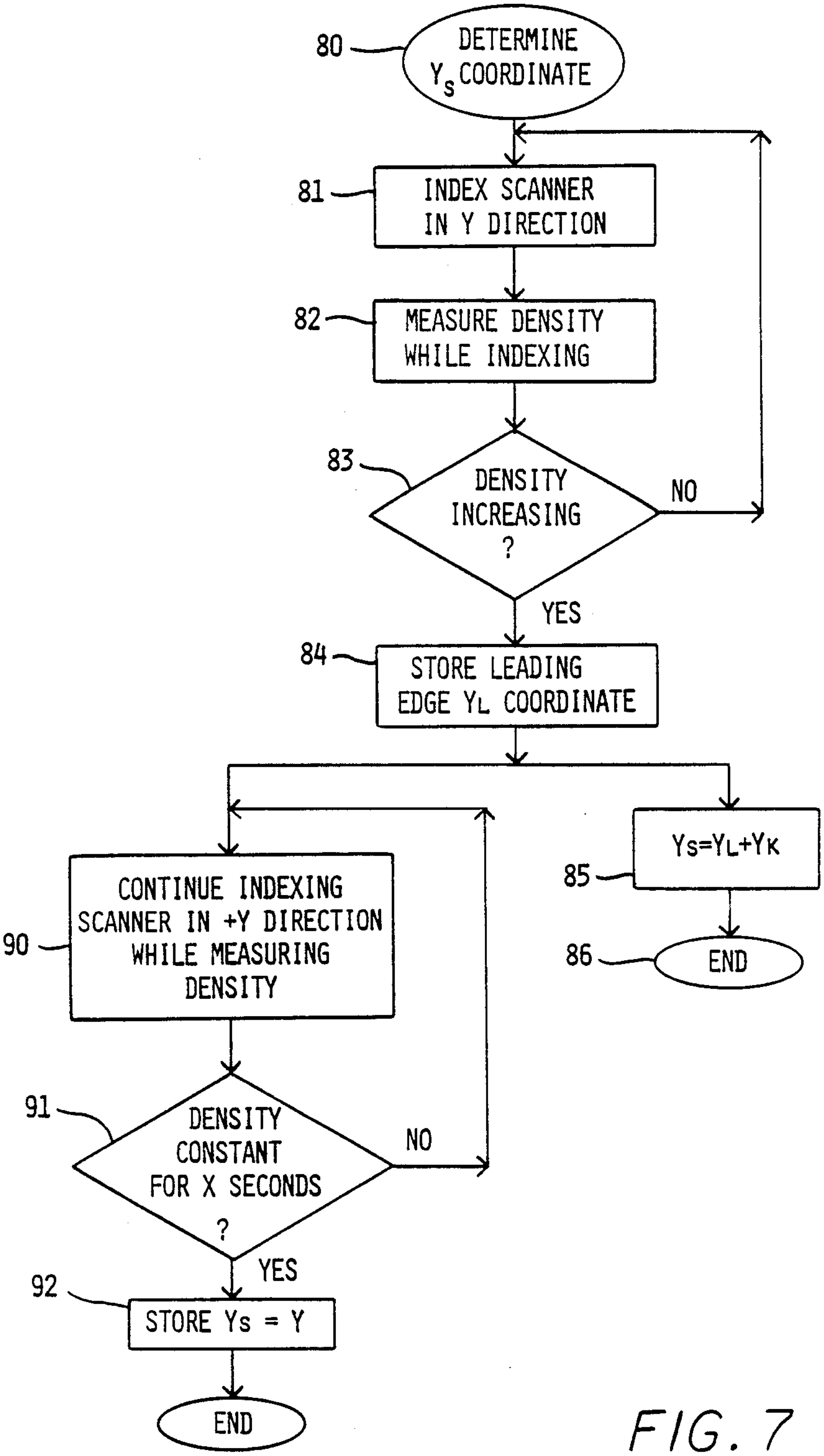

FIGS. 6 and 7 illustrate alternative means for performing the step 62 of FIG. 5, that is, the step of determining the starting coordinate $Y_s$ for the initial patch 28 of the test strip. FIG. 6 illustrates one embodiment of such procedure in which the determination of the $Y_s$ coordinate is called at a step 70. In the step 71 (which it is recalled follows the indexing of the scanning head to the index mark 26) the scanning head is then indexed in the positive Y direction. During indexing, a step 72 is continuously performed to measure the density by means of the densitometric sensing circuitry. A test 73 is continuously performed to determine if the density is increasing, in other words, to determine if the sensing element 31 is progressing from white paper into the test strip as illustrated in FIG. 3*b*. If it is not, the test 73 continues to branch through the steps 71 and 72 to continue indexing the sensor in the positive Y direction while measuring the density. When it is determined in the test 73 that the density has begun to increase, signifying detection of the leading edge of the test strip, a step 74 stores the leading edge coordinate $Y_L$ in the RAM 42.

Having determined one edge of the test strip, the program then proceeds to determine the trailing edge of the test strip. Thus, a step 75 is performed to continue indexing the sensor in the positive Y direction while also continuing to measure the density. Following the step 75, a test 76 is performed to determine if the density is decreasing. If it is not, indicating that the scanning element is still within the test patch, the test 76 tests negative, returning for continued performance of the step 75. Once the sensing element begins to leave the test strip (as illustrated in FIG. 3*c*, the test 76 will test positive, since the scanning element is leaving the printed section and beginning to sense a portion of the unprinted paper. Thus, the trailing edge of the test patch has been detected in a step 77, and the coordinate $Y_T$ of that trailing edge is stored in the RAM 42. The system now contains information on the leading and trailing edges of the first test patch of the test strip, and can perform a computation (as modified of course by the size of the sensing aperture), to determine the starting Y coordinate $Y_s$ for the test strip. In the step 78 illustrated in FIG. 6, for sake of simplicity, the trailing and leading edges are average and are added to the coordinate of the leading edge to determine a starting position which is approximately that illustrated in FIG. 3*a*.

The invention is not limited to a particular computation for determining the coordinate $Y_s$, but broadly encompasses all means of, having located the first coordinate $X_s$ by mechanical means, of determining the second coordinate $Y_s$ by utilizing the information provided by the densitometer with respect to the size of the test patch. FIG. 7 illustrates two additional modes for determining the beginning coordinate $Y_s$. More particularly, in the program 80, as in the program 70, the sensing head, having been indexed to the $X_s$ starting coordinate determined by the mechanics of this system, begins to index in the Y direction at a step 81. As in the previous embodiment, the density is measured while indexing in the step 82 and a test 83 is performed to determine if the density is increasing. If it is not, indicating that the scanning head is continuing to traverse unprinted paper, the program continues to loop through steps 81 and 82. When the density begins to increase, indicating that the FIG. 3*b*condition has been reached, a step 84 is performed to store the leading edge $Y_L$ coordinate.

Having stored that coordinate, several options are available, two of which are illustrated in FIG. 7. For a first option, a step 85 is performed which takes the leading edge coordinate $Y_L$ and adds it to a predetermined Y coordinate $Y_k$ (a constant coordinate) to determine a starting coordinate $Y_s$. Such an implementation is based on the predetermined knowledge of the width of the test strip, which allows the system, having detected the leading edge of the test strip, to simply increment the Y coordinate by a predetermined amount to derive a starting coordinate for the commencement of the scan. When that option is selected, the program ends at 86, following which the microprocessor initiates the scan of the entire test strip.

In an alternate embodiment, having determined the leading edge coordinate $Y_L$, a step 90 is performed to continue indexing the scanner in the positive Y direction while measuring the density. A subsequent test 91 is performed to determine if the density is constant for a predetermined period of time. Thus, the system is simply assuring that the printed indicia which triggered step 90 is indeed the test strip by assuring that for a certain number of milliseconds during the continued indexing the density remains constant. When the density remains constant, the system is assured that the scanning aperture of the sensing head is within the test strip, and then, pursuant to a positive test, performs the step 92 which stores the existing Y coordinate as the starting coordinate $Y_S$ for the subsequent scan. The program ends at 93, following which transfer is made to the subsequent modules controlled by the microprocessor to initiate the X scan and subsequent strobing of the densitometer to measure the optical density of each of the test patches along the test strip.

As noted above, it is not necessary in each case after the system is operating to perform a renewed scan for a starting Y coordinate. More particularly, when the printing process is operating under control, the test strip is ordinarily printed at a predetermined position with respect to the edge of the sheet. Thus, scanning time can be saved by storing of the $Y_S$ starting coordinate for the previous scan and immediately indexing the scanning head to that Y coordinate. Thus, in that mode, it is only necessary to index the scanning head to the $X_S$ starting coordinate determined by the index mark and the Y starting coordinate $Y_S$ determined for the previous scan, then simply index the scan a predetermined slight amount in the negative Y and positive Y directions similar to test 91 of FIG. 7 to determine that the optical density remains constant. If it does, the initial coordinate Y is stored as a starting coordinate $Y_S$ for the scan of the test strip on the subsequent sheet. If it does not, a procedure similar to procedure 90 is followed (or the procedure of FIG. 6 for that matter) to determine a new starting coordinate $Y_S$ which is utilized for that scan and as a starting position for subsequent scans.

It will now be appreciated that what has been provided is a new scanning apparatus and method which does not complicate the nature of the test strip printed on the page and does not require an overly complex scanning head or control circuit. The positioning table for the sheet to be scanned is such that the sheet is located in a predetermined location with respect to both X and Y axes. The scanning system knows by virtue of the positioning of one of the coordinates of the test strip, and scans in the other direction while monitoring the output of the associated densitometric circuitry for determining, by virtue of the size of the first test patch of the test strip a second coordinate for the scan. Thus, being provided with both coordinates to initiate a scan, the system then scans the sensing head along the test strip while measuring the optical density of each test patch as a means of determining the quality of the printed product being produced at the time.

What is claimed is:

1. Apparatus for scanning and measuring the optical density of an ink test strip printed on a sheet, the ink test strip being partitioned into discrete zones corresponding to the ink density of respective zones of print on the printed sheet, the apparatus comprising the combination of:

- a supporting surface for the sheet having a guide for positioning the sheet in a first dimension on the surface, and an indicator associated with the guide for locating a first one of the zones of the test strip at a predetermined location $X_S$ in a second dimension along the guide,
- densitometric sensing means including a density measuring head having at least one density measuring receiver disposed to measure light reflected from the sheet,
- drive means for the measuring head for translating the measuring head in a first direction parallel to the guide and a second direction perpendicular to the guide,
- control means including
  - first means for traversing the measuring head parallel to the guide to position the measuring head in a predetermined relationship with respect to the indicator for establishing a first starting coordinate $X_S$,
  - second means for traversing the measuring head in a direction perpendicular to the guide and cooperating with the densitometric sensing means for positioning the sensing means over the test strip and establishing a second starting coordinate $Y_S$, and
  - means for initiating a scanning sequence along the test strip of the scanning head as positioned by said second means.

2. The apparatus of claim 1 in which the ink test strip is discontinuous and the means for initiating continues the scanning sequence irrespective of discontinuities in the ink test strip.

3. The apparatus of claim 1 further including means for storing the starting position $Y_S$ of a sheet being scanned, and the control means including means interposed between the first and second means for traversing the measuring head to the coordinate $Y_S$ of the previous sheet.

4. The apparatus of claim 1 in which the indicator associated with the guide is a predetermined physical mark associated with the guide for locating the first test path of the test strip over the mark thereby to physically establish the starting coordinate $X_S$ before initiating the traversing of the measuring head.

5. The apparatus of claim 1 in which the second means includes means for detecting a change in optical density by means of the densitometric sensing means when the measuring head traverses into the test patch.

6. The apparatus of claim 1 in which said second means includes means cooperating with the densitometric sensing apparatus for detecting the coordinates of the leading and trailing edges of the test patch of the test strip, and means for operating on the coordinates of the leading and trailing edges for determining a second starting coordinate $Y_S$.

7. A method of scanning and measuring the optical density of an ink test strip printed on a sheet, the method comprising the steps of,

- providing a supporting surface having a guide means and an index mark associated with the guide means,
- manually positioning the sheet on the guide means such that one of the coordinates $X_S$ of the ink test strip is physically positioned in a predetermined relationship with respect to the guide means and the index mark,
- automatically indexing a scanning head (1) in a first direction to the coordinate $X_S$ at the index mark and (2) in a second direction toward the ink test strip,
- monitoring the optical density sensed by the scanning head while indexing the scanning head toward the test strip, determining a starting coordinate $Y_S$ within the test strip by means of monitoring the optical density while traversing the scanning head into the test strip, and initiating a scan of the test strip, and $X_S$, $Y_S$.

8. The method of claim 7 in which the step of determining the $Y_s$ coordinate comprises determining the leading edge coordinate of the first test patch of the test strip, determining the trailing edge coordinate of the first test patch of the test strip, and performing a manipulation on the leading edge and trailing edge coordinates to determine an intermediate coordinate $Y_s$ within the test strip.

9. The method of claim 7 in which the step of determining the $Y_s$ coordinate comprises detecting the leading edge of the first test patch of the test strip and adding to the coordinate of the leading edge a predetermined increment to index the scanning head beyond the leading edge into an intermediate position in the test strip.

10. The method of claim 7 in which the step of determining the $Y_S$ coordinate comprises determining a coordinate $Y_L$ of the leading edge of the test strip, having determined the leading edge, monitoring the density of the test strip while continuing to index the scanning head into the test strip, detecting the condition where the density remains substantially unchanged for a predetermined increment of time, and selecting a coordinate associated with the unchanged optical density as the starting coordinate $Y_s$ for the test strip.

11. The method of claim 7 further including the step of storing the starting coordinate $Y_s$ for a particular sheet being scanned and utilizing the starting coordinate $Y_s$ for a previous sheet as the starting coordinate for a subsequent sheet to be scanned.

* * * * *

UNITED STATES PATENT AND TRADEMARK OFFICE
CERTIFICATE OF CORRECTION

PATENT NO. : 4,963,028

DATED : October 16, 1990

INVENTOR(S) : Rolf Braun, Alfred Dorn, Joachim Muller and Franz Lampersberger

It is certified that error appears in the above-identified patent and that said Letters Patent is hereby corrected as shown below:

On the face of the patent at [75] Inventors, Franz Lampersberger should be added as a fourth inventor.

Col. 8, line 47, "3bcondition" should be --3b condition--.

Col. 11, line 3, after "test strip" delete "and" and insert --at the coordinates--.

Signed and Sealed this

Twenty-sixth Day of May, 1992

*Attest:*

DOUGLAS B. COMER

*Attesting Officer*

*Acting Commissioner of Patents and Trademarks*